XR 3,986,119

United States Patent [19]

Hemmer, Jr. et al.

[11] 3,986,119

[45] Oct. 12, 1976

[54] EMERGENCY COMMUNICATION SYSTEM

[75] Inventors: Nicholas Howard Hemmer, Jr., Poughkeepsie, N.Y.; Agis Demetrius Valakos, Bethesda, Md.

[73] Assignee: International Business Machines Corporation, Armonk, N.Y.

[22] Filed: Dec. 28, 1973

[21] Appl. No.: 429,241

[52] U.S. Cl. .......... 325/3; 325/5; 325/53; 325/64; 340/24; 340/31 R; 340/33; 340/226

[51] Int. Cl.² .......... H04B 7/00

[58] Field of Search .......... 325/3, 5, 39, 53, 54, 325/62, 64, 31, 67, 363; 343/178; 179/1 VE, 41 A; 340/213.1, 213.2, 226, 311–313, 31–33, 23, 24

[56] References Cited

UNITED STATES PATENTS

| | | | |
|---|---|---|---|
| 2,678,998 | 5/1954 | Young, Jr. | 325/53 |
| 2,978,676 | 4/1961 | Spencer | 340/154 |
| 3,441,858 | 4/1969 | Graham | 325/55 |
| 3,694,579 | 9/1972 | McMurray | 179/5 R |
| 3,721,955 | 3/1973 | Schiff et al. | 340/33 |
| 3,824,469 | 7/1974 | Ristenblatt | 325/39 |
| 3,864,674 | 2/1975 | Worsham et al. | 325/64 |
| 3,866,206 | 2/1975 | De Giorgio et al. | 340/226 |
| 3,876,980 | 4/1975 | Haemmig | 325/53 |
| 3,914,692 | 10/1975 | Seaborn, Jr. | 325/64 |
| 3,939,417 | 2/1976 | Cannalte et al. | 325/5 |

*Primary Examiner*—Robert L. Griffin
*Assistant Examiner*—Marc E. Bookbinder
*Attorney, Agent, or Firm*—J. G. Cockburn; John G. Wynn

[57] ABSTRACT

An emergency communication system used by stranded motorists to summon help when travelling on toll roads or other limited access highways. The emergency communication system comprises a portable, self-powered, hand-held transceiver set which transmits coded distress signals and directional signals, when activated, and cycles until reception of an answer back signal. The signals or messages from the portable transceiver are transmitted at incrementally increasing power levels to a single or a plurality of roadside relay stations spaced strategically along a limited access highway or toll road. The relay stations retransmit the signals to a terminal station which has means to decode the signals and determine the location of the repeater station nearest to the stranded motorist. The terminal station also has means for displaying the location of the relay station with the information derived from the decoded signal, and means for generating an answer back signal which is transmitted via the roadside relay station to the portable handset.

5 Claims, 11 Drawing Figures

FIG. 7
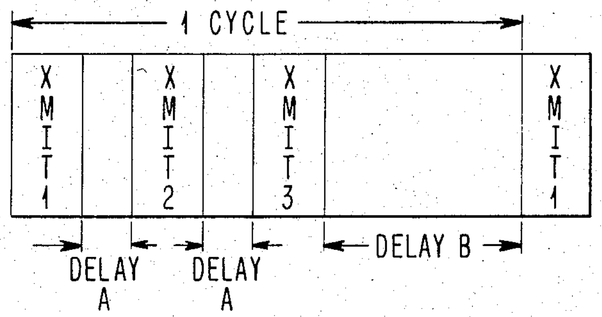
FIG. 8
| COUNTER 115 STATES | | POWER CONTROL STATES | | XMIT CYCLE |
|---|---|---|---|---|
| TERMINAL 32 | TERMINAL 33 | 10% (A9A) | 25% (A9B) | RESET (A9D) |
| 0 | 0 | 0 | 1 | 1 |
| 0 | 1 | 1 | 0 | 1 |
| 1 | 0 | 1 | 1 | 1 |
| 1 | 1 | 1 | 1 | 0 |
FIG. 10
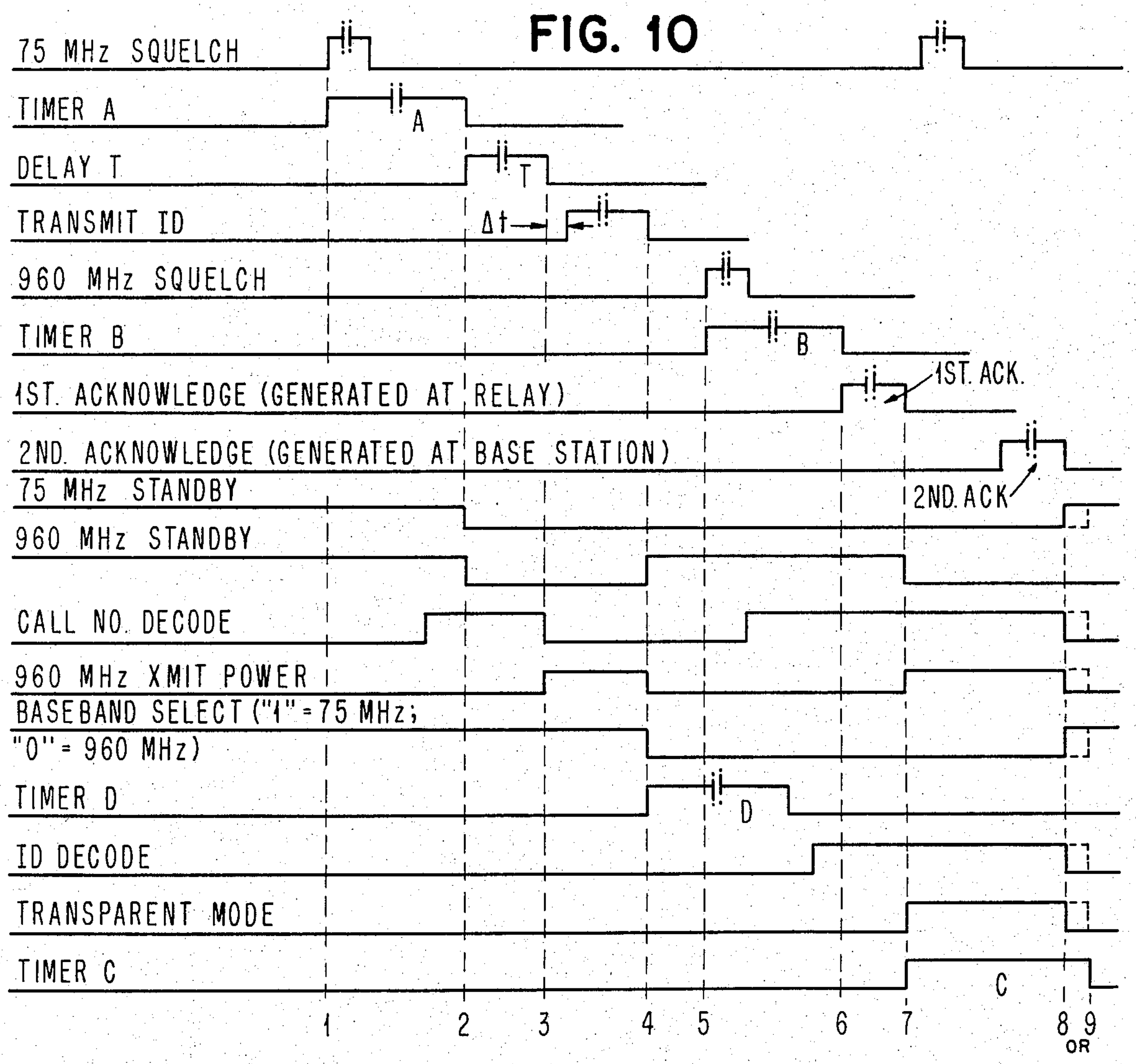

EMERGENCY COMMUNICATION SYSTEM

BACKGROUND OF THE INVENTION

Field of the Invention

This invention relates to communication systems which transmit information via radio waves from one point to the next. Specifically, the system comprises a transmitter or means which converts information signals such as audio or coded signals for propagation through or along a transmission medium. The transmitter is coupled to the medium and at least one receiver is coupled to the medium such that the information or modulated signal transmitted may be derived from the received modulated carrier wave signals and converted into signals corresponding to the information transmitted.

2. Description of the Prior Art.

In recent years, there has been a concerted effort on the part of federal and state highway agencies to improve emergency communication systems used by stranded motorists on rural and urban freeway systems, toll roads, and other limited access highways. Generally, contemporary emergency communication systems transmit coded information to a terminal station. The coded information is decoded at the terminal station and help is dispatched to the stranded motorist.

One type of contemporary emergency communication system consists of roadside call boxes positioned at specified distances along the perimeter of a limited access highway or toll road. A stranded motorist leaves his car, walks to the nearest box and places his request. The call box has means to encode the motorist's request and transmits the request in the form of a coded radio signal to a remote terminal station. On receipt of the coded radio signal, the terminal station decodes the signal and help is dispatched to the stranded motorist. In this type of emergency communication system, the terminal station does not generate an answer back signal acknowledging the receipt of the motorist's message. In other words, the motorist does not know whether or not his message has been received.

Although the above-identified type of emergency communication system, hereinafter called the fixed call box system, is accurate, if not precise, in locating the location of a stranded motorist, it has several drawbacks. One of the drawbacks is that the motorist has to walk across the highway or along the shoulder of the highway to operate the call box. The practice of crossing or walking along the shoulder of a highway in order to activate the call box places the stranded motorist in danger, in that he may be injured by automobiles traveling along the highway. In addition, the fixed call box systems have no indicating means to warn a motorist of failure in the system. The net result is that a motorist may be trying to obtain help from an inoperative call box. During an emergency, the lack of indicating means may be disastrous.

In addition, these systems are susceptible to pranksters. There have been several occasions where emergency personnel have been dispatched to call box locations only to find that there is no need for their services. The reason is that mischievous youngsters, traveling along limited access highways, generally stop their vehicle, activate the call boxes and then move on. Since the system has no way of determining the caller, the guilty party is not apprehended. Also, in a situation where emergency personnel is limited, a genuine call may go unattended.

In another type of emergency system, referred to as a mobile communication system, a call box is attached to a vehicle. In case of an emergency, the stranded motorist manually activates the call box and a coded signal is transmitted to a terminal station. In case of impact, some of these systems will automatically transmit. On receipt of this signal by the terminal station, an operator will determine the approximate location of the stranded motorist. The terminal station then transmits an "acknowledgement" to the stranded motorist informing him that his message has been received. Although the mobile communication system has solved some of the problems posed by the fixed call box communication system, the mobile communication system has several problems of its own.

Perhaps one of the greatest problems with the mobile emergency communication system is the inability of the system to determine the location of the stranded motorist accurately. In this type of emergency communication system, direction finding techniques are utilized to determine the direction from which the coded signal is received from the terminal station and hence the direction of the stranded motorist. Specifically, most of these systems utilize a so-called "Adcock" type antenna which operates on a nulling or peaking scheme to determine the azimuth or direction from whence the coded signal comes. In these types of systems, there is an ambiguity as to whether the signal is coming from the back or the front along the line of the azimuth relative to the position of a terminal station with an antenna. For example, suppose a terminal station with an Adcock type antenna is located between two parallel highways and a motorist is stranded on either of these highways. The motorist will activate the call box and the box will transmit emergency signals to the terminal station. On receipt of these signals by the Adcock antenna, an operator will determine the azimuth or direction of the stranded motorist, based upon the readings of the Adcock antenna relative to the terminal station. However, it should be noted that the azimuth crosses both highways and since the Adcock antenna is only capable of determining the azimuth from whence the distress signals come, there is no way for the operator to determine which highway the stranded motorist is on. In addition, this type of system does not identify the direction of travel of the motorist. It should also be noted that this type of system requires an operator to locate the approximate position of the stranded motorist.

Another drawback with the mobile emergency communication system is that both the call box and the transmitting antenna have to be mounted on the vehicle. In most cases, power for the system is obtained from the battery of the vehicle. In a typical situation, a motorist on entering a limited access road rents one of the systems and attaches it to his vehicle. On leaving the limited access road the motorist has to remove the system. The chore of attaching and removing the system is very cumbersome to motorists. Due to the cumbersomeness of the system, its usefulness for other purposes are rather limited, i.e., only motorists can use the system since the system has to be hard mounted onto a vehicle. Other prospective customers, for example, cyclist, and people who are hiking cannot use the system since it is impractical to mount. In addition, the system is expensive and consumes a relatively high amount of power.

Neither of the above described emergency communication systems meet the present day needs of motorists since the described systems are plagued with several inherent problems.

One of the pressing problems of the prior art emergency communication systems is that coded signals or messages are transmitted at higher power levels than is necessary to make contact with a terminal station and obtain help. The net result of high power transmission is that it aggravates the problem of electromagnetic interference within a shared frequency band, i.e., a frequency band which is assigned to a plurality of users. The problem of high power transmission stems from the fact that designers of prior art communication systems design for "worse case" conditions. The term "worse case" means that the designer will ascertain the maximum power which is required under the worse atmospheric conditions and will design the unit to radiate at fixed maximum power at all times to ensure contact with a base station.

Another problem of the prior art emergency communication systems is path loss. Path loss is the attenuation of a radio signal between finite points due to changes in atmospheric conditions due to rain, snow, fog, icing, time of day, month of the year, sun cycles, etc. The path losses also vary due to topography, ground electrical characteristics and other obstructions. Due to the uncertainty and unpredictability of path loss, the range (i.e., location) of a radio transmitter can not be determined accurately by the amplitude of the received signal. Instead of using amplitude (power) to determine range, the prior art systems determine the range (location) of a radio transmitter by measuring the time of arrival of a signal between two known points, or as it is called the "hyperbolic method". Another method is to measure "the round trip time" for a signal to reach a target and return or as it is called "active ranging." Notwithstanding the prior art ranging methods, the radio transmitter still has to transmit the signal at a relatively high power level (i.e., the maximum power required under the worse atmospheric conditions) to circumvent the effects of path loss, and as noted above, this is not desirable.

OBJECTS OF THE INVENTION

Therefore it is an object, according to the present invention, to transmit coded signals at relatively lower power levels and to automatically locate the position of a stranded motorist more accurately than has heretofore been possible.

It is still a further object, according to the present invention, to provide an emergency communication system which is relatively simple in design, relatively easy to use, low in cost and reliable in operation.

It is still a further object, according to the present invention, to discourage or minimize the tampering of emergency communication systems by pranksters and therefore minimize false alarms at a terminal station.

SUMMARY OF THE INVENTION

The above-identified objects and features of the present invention are accomplished by providing a self-powered, hand-held hand-operated, portable handset capable of automatically transmitting, at incrementally increasing power levels one of a plurality of coded distress signals and one of a plurality of coded directional signals via a plurality of roadside relay stations to a remote terminal station.

When in use, distress and directional information are keyed into the portable handset for transmission to the terminal station. The portable handset outputs a a modulated RF signal, containing a squelch code and a system identification number which activates and unlocks a roadside relay station. The relay station then generates and transmits a signal containing the original signal and its relay station identification number to the terminal station.

On receipt of this signal, the terminal station transmits a control signal back to the selected roadside relay station. The control signal from the terminal station causes the roadside relay station to transmit a "first acknowledge" signal to the portable handset and places the roadside relay station in a transparent mode. When the roadside relay station is in the transparent mode, it will accept all messages and retransmit the messages to the terminal station without modification. The handset automatically responds to the "first acknowledge" signal by transmitting the keyed-in distress and directional messages which are relayed by the roadside relay station to the terminal station.

The terminal station then decodes the message, determines the location of the roadside relay station nearest to the transmitting portable handset and displays the message and the identification number of the relay station on a display means. The terminal station then generates a "second acknowledge" signal which is relayed back to the portable handset by the roadside relay station. This "second acknowledge" signal turns off the portable handset and activates an indicator assuring the user that the message has been received.

If, for any reason, the "first acknowledge signal" is not received at the portable handset, within a predetermined time, the portable handset will automatically repeat the transmission of the distress and directional signal at a higher power level. If no "first acknowledge" is obtained, the portable handset will automatically try once more at a third higher power level. If the "second acknowledge" is still not obtained, the portable handset will automatically recycle through the above outlined sequence of transmissions beginning with the RF signal which activates and unlocks the roadside relay station.

BRIEF DESCRIPTION OF THE DRAWINGS:

FIG. 7 shows a transmission cycle of the portable handset.

FIG. 8 shows a truth table of the variable power control states.

FIG. 10 shows the roadside relay station timing diagram.

DESCRIPTION OF THE PREFERRED EMBODIMENT:

For simplicity of the description, the Emergency Communication System will be divided into three subsystems, namely: the portable handset, the roadside relay station, and the terminal station.

Figure 1:
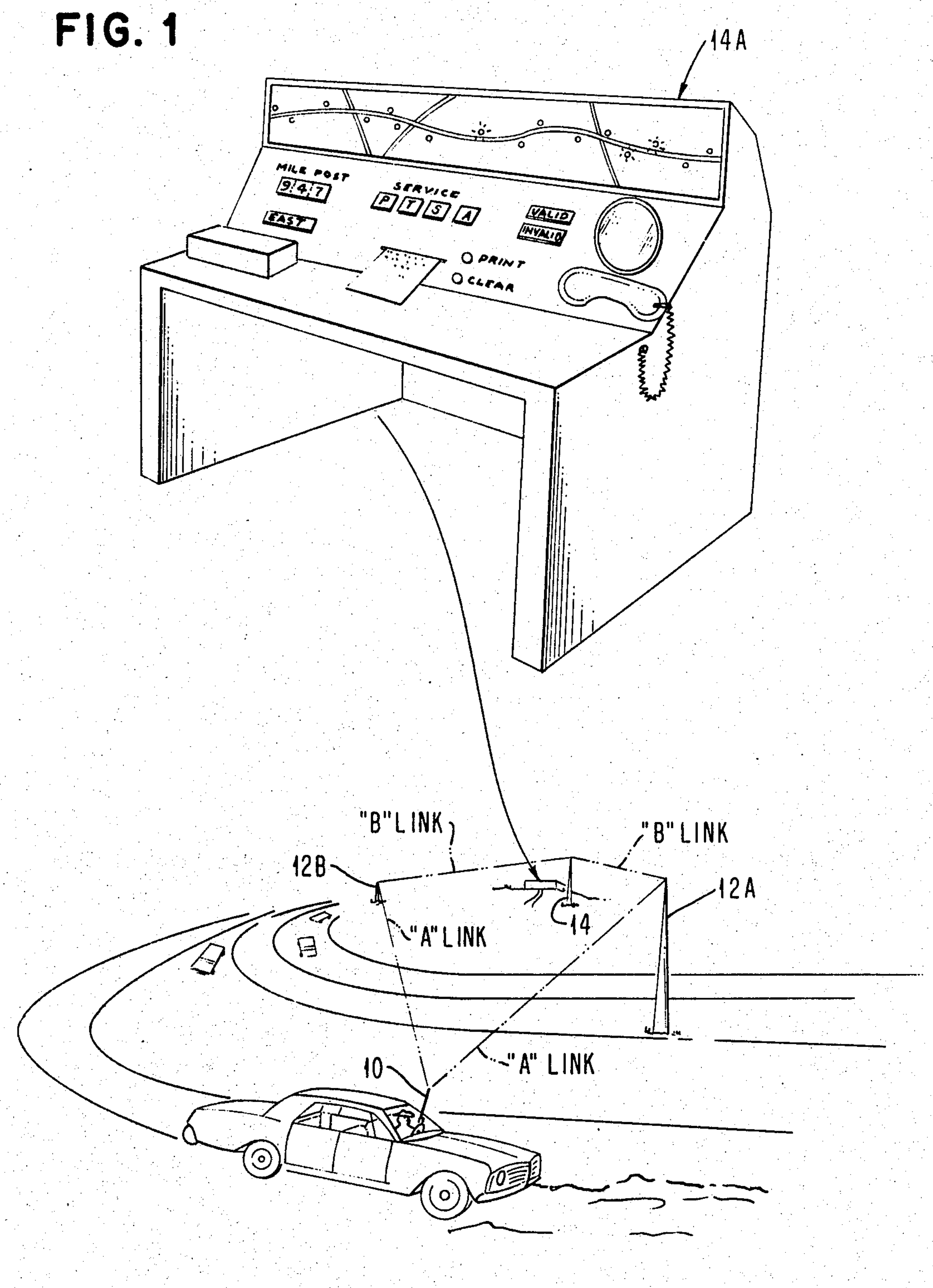
FIG. 1 is an overall perspective view of a highway in which a communication system embodying the present invention may be employed.

However, before describing the various subsystems in detail, an overview of the entire system will be given. FIG. 1 depicts the overall system with motorist traveling on the highway. Spaced, at strategic positions, along the right-of-way of the highway are a plurality of roadside relay stations. The fact that only two of the roadside relay stations 12A and 12B are shown in FIG. 1 should not be construed as a limitation since the roadside relay stations are spaced at fixed distances throughout the entire length of the highway. Portable handset 10 is shown interconnected to the roadside relay stations 12A and 12B via radio frequency A link. The A link can be one of the channels in the emergency band between 72 and 76 MHz. The A link message or signal is in coded tones squelched so that the A link receivers of the roadside relay stations will reject or lock out all traffic and ambient noise on the A link frequency. The receiver will only open up, i.e., receiver a message after the proper coded tone signature, from the portable handset 10 has passed through the receiver detectors of the roadside relay stations.

Referring again to FIG. 1, the roadside relay stations 12A and 12B are interconnected to terminal station 14 via radio frequency B link. The B link is in a higher radio frequency channel than that of the A link, i.e., 960 MHz. Inside the terminal station 14 is a dispatcher console 14A. This dispatcher console monitors the highway and displays the position of the roadside relay station nearest the stranded motorist and the type of emergency services which the motorist requires.

Figure 2:
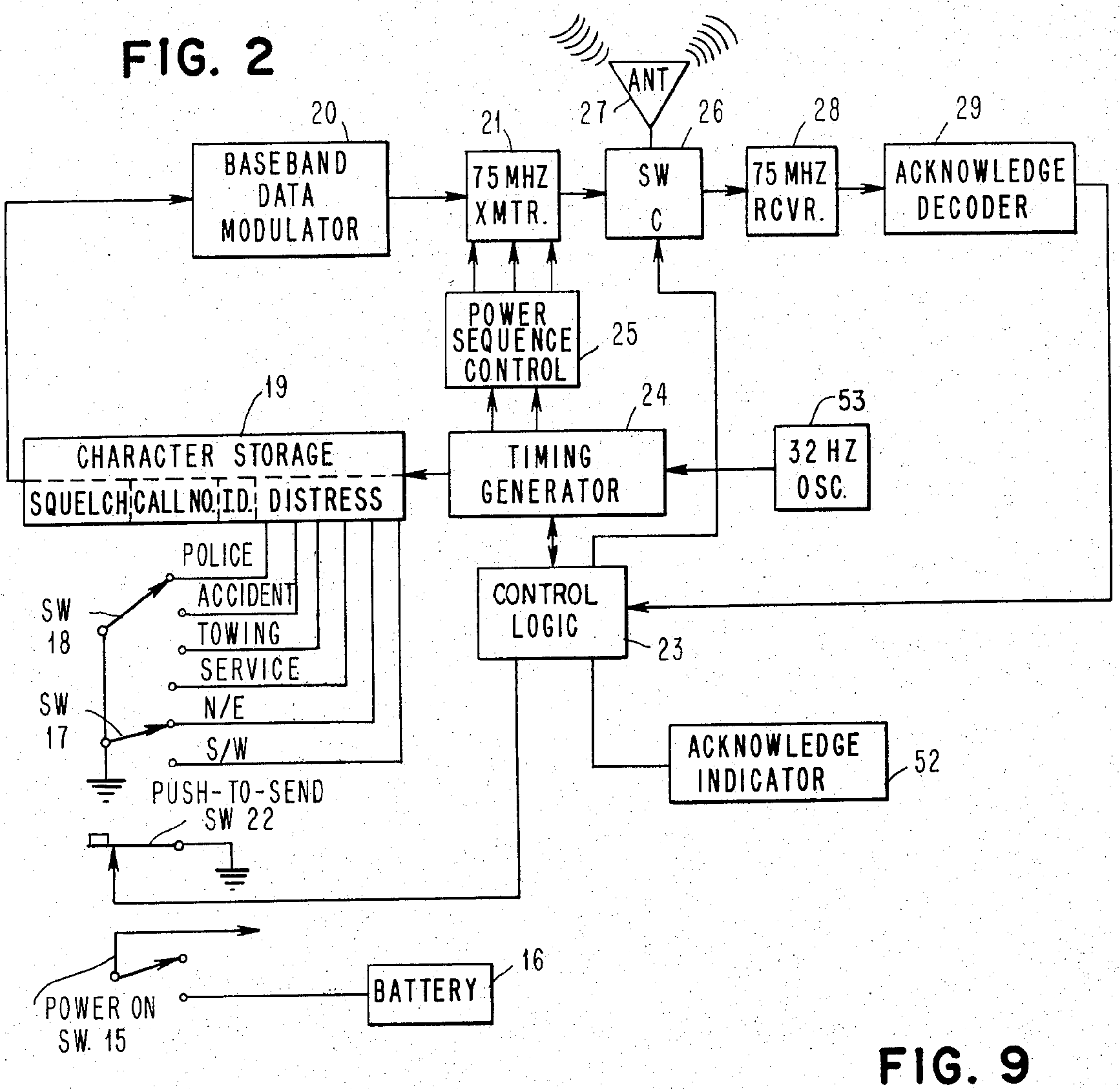
FIG. 2 shows the portable handset of the present invention in block diagram form.

Having described the overall structure of the emergency communication system, the following is a brief description of the portable handset with a more detailed description to follow. Referring now to FIG. 2, a block diagram of the portable handset 10 is shown. Power on reset switch 15 is interconnected to a battery 16. Activation of the power on switch 15 will provide power to all portions of the portable handset except the RF transmitter 21 which will be powered-up only during signal transmit times. Distress select switch 18 is a four position switch interconnected to a 16 character data buffer 19 hereinafter referred to as character storage element 19. The storage element 19 could be any type of storage element which is used in contemporary computer systems, such as registers or delay lines. Interconnected to the distress select switch 18 and the character storage element 19 is a two position directional switch 17. Each position of the distress switch 18 is used for inputting distress signals (police, accident, towing, service, etc.) while each position of the directional switch 17 is used for inputting direction of travel. The distress signals specify the type of assistance which the motorist needs and the directional signals specify the direction of travel. Although the distress switch 18 and the direction switch 17 is shown as a four and two position switch respectively, this should not be construed as a limitation since the switches may have any desired number of positions.

The character storage element 19 receives data from the distress switch 18 and the directional switch 17 and transmits this data, along with fixed or predetermined data, to the terminal station via the roadside relay stations. Each of the characters in the storage element 19 is a numeric 0–9. The character breakdown of the storage element 19 is as follows:

| | |
|---|---|
| a) Squelch Code | 1 character (FIXED) |
| b) System Entry ID (call no.) | 6 characters (FIXED) |
| c) Unit Serial Number (ID) | 8 characters (FIXED) |
| d) Distress Code | 1 character (MANUAL ENTRY) |
| TOTAL | 16 characters |

It should be noted that the system entry ID (call no.) is identical for all portable handsets, and the unit serial number (ID) is different for each unit. The system entry ID, hereinafter called the system call number, is decoded and checked by the roadside relay station to determine if the coded signal should be accepted. If the system call number checks out, i.e., the received system call number is equivalent to the valid system call number, the coded signal will be accepted by the roadside relay station. On the other hand, if the received system call number is not valid, the coded signal will not be accepted. Likewise, the unit serial number is recorded in the terminal station and is used to identify the handset which transmits coded signals to the terminal station via the roadside relay. With this scheme of recording the unit serial number it is easy to determine the user of the handset at any point in time.

The character storage element 19 is interconnected to a data modulator 20 and the data modulator is interconnected to a transmitter 21. Push-to-send switch 22 is a push button switch which is interconnected through control logic 23 to timing generator 24. By activating the push-to-send switch 22, the portable handset reverts into an automatic transmission mode and transmits coded signals or information at programmed intervals. Timing generator 24 is interconnected to the power sequence control 25. The power sequence control 25 is controlled by the control logic 23 and the timing generator 24. The timing generator 24 which, in turn, is controlled by oscillator 53 determines the power levels at which coded information will be transmitted through switch 26 to antenna 27. Switch 26 is also under the control of the control logic 23 which determines whether the handset is receiving or transmitting coded information. Receiver 28 is interconnected through acknowledge decoder 29 to the control logic 23. As will hereinafter be explained in more detail, at the end of each transmission, the handset switches into a receiving mode and on receipt of an answer back signal the acknowledge decoder 29 decodes the signal and uses the signal to either retransmit the contents of the character storage element 19 or turn off the portable handset.

Figure 3:
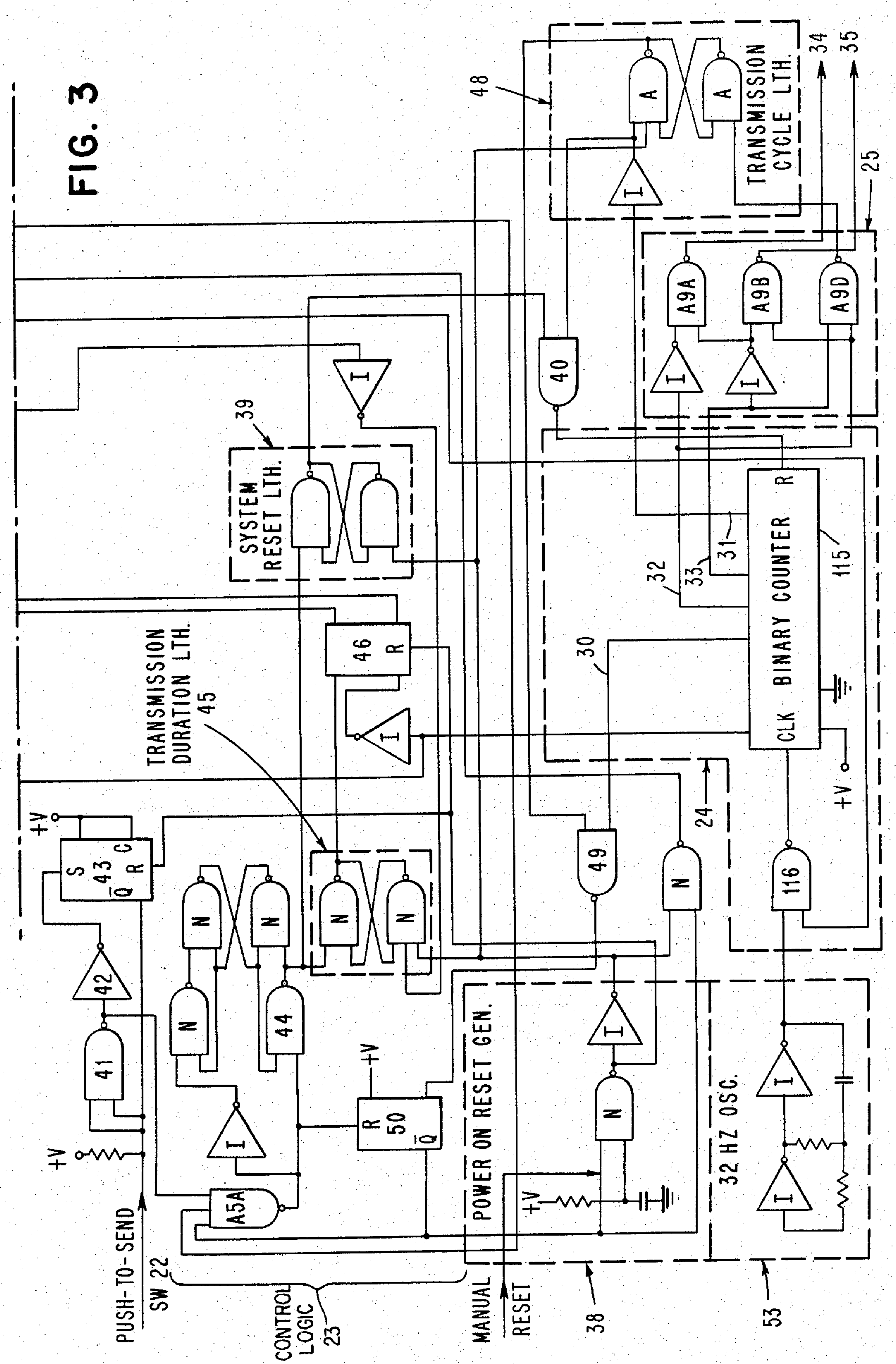
FIGS. 3 and 3*a* shows the detailed embodiment of the portable handset of the present invention.
Figure 3A:
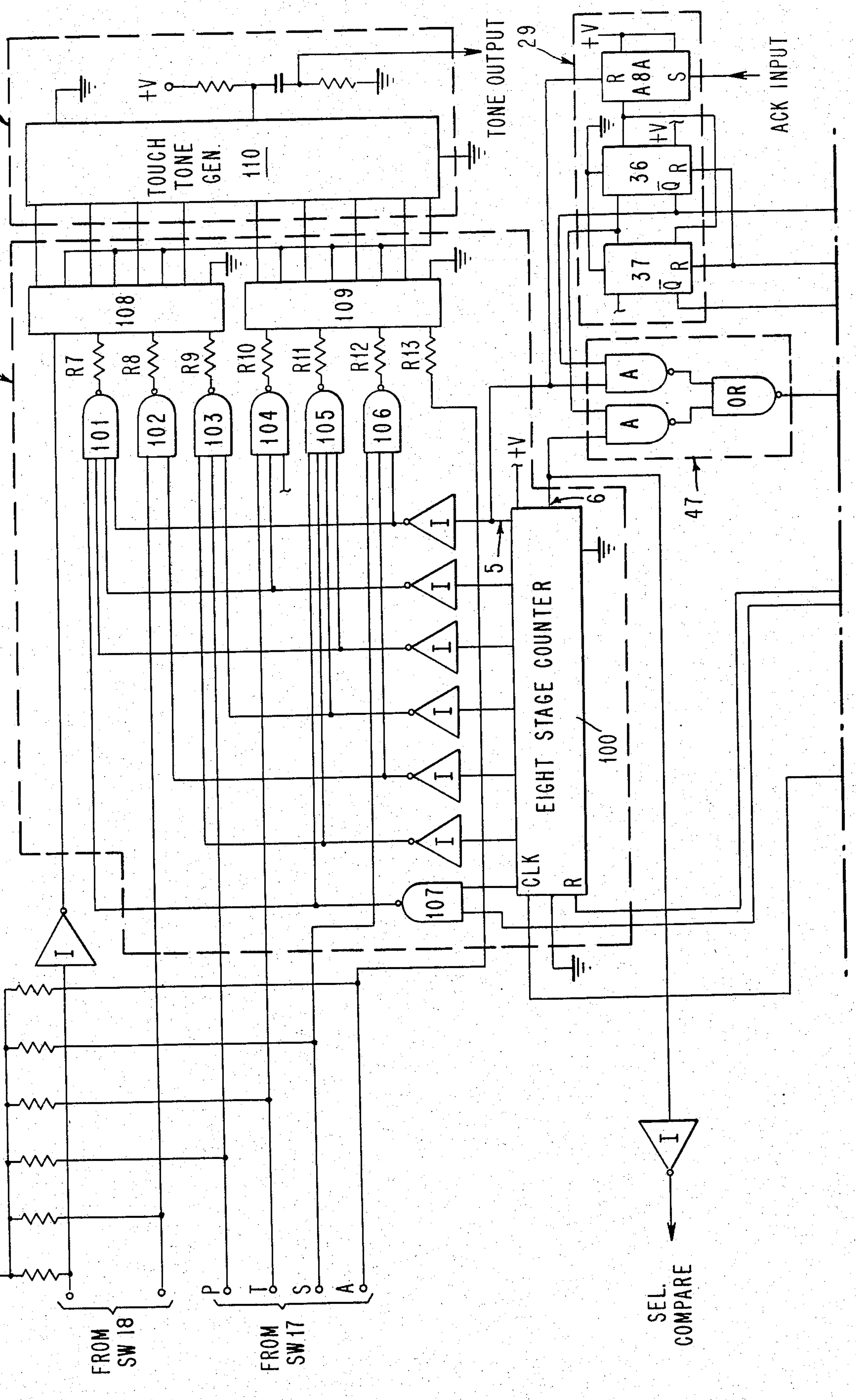

Referring now to FIGS. 3 and 3a, a more detailed embodiment of the portable handset is shown. As previously mentioned, character storage element 19 receives the distress and directional signals from the distress and the directional switches for transmission to the terminal station via the roadside relay station. The character storage element 19 comprises an eight stage counter 100 with tone select gates 101, 102, 103, 104, 105, 106 and 107, and transistor switches 108 and 109.

The output of the counter is interconnected to the select gates via a plurality of inverters and the output of the select gates are interconnected to transistor switches 108 and 109 via resistors R7 through R13. Each resistor R7 through R13 has an approximate value of 24K. The outputs of the transistor switches 108 and 109 are interconnected to the touch tone generator 110 which generates the coded tone for transmission. As can be seen from FIG. 3, the scheme used for generating the digital coded signal is dual tone multifrequency modulation, also known as touch tone. This scheme is well known in the art and will not be discussed any further. Of course, several other well known modulation schemes may be used for generating the coded signal, for example, frequency shift keying (FSK), pulse code modulation (PCM), etc.

Still referring to FIGS. 3 and 3*a*, timing generator 24 comprises a binary counter 115 and a control gate 116. Binary counter 115 generates the power sequence control signals on terminal 32 and terminal 33, and delay A and delay B signals on terminal 30 and terminal 31, respectively. As will be described hereinafter, delay A determines the frequency of transmission within a given transmission cycle while delay B determines the dwell time between intermittent transmission cycles (i.e., delay B determines the time between the end of one transmission cycle and the beginning of another transmission cycle). Of course, binary counter 115 can generate a plurality of delays and a plurality of power sequence control signals and the fact that only two delays and only two power sequence control signals are shown should not be construed as a limitation.

Figure 9:
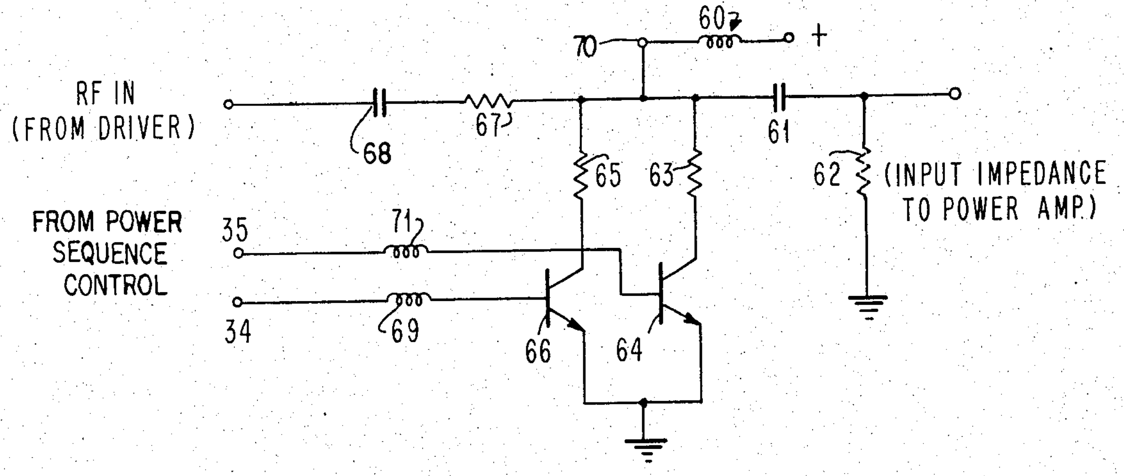
FIG. 9 shows the attenuator circuitry of the portable handset.

As previously mentioned, timing generator 24 is interconnected to power sequence control 25. Power sequence control 25, in conjunction with the power sequence control signals on terminal 32 and terminal 33, generates the incrementally increasing power levels at which coded signals are transmitted from the portable handset. Power sequence control 25 comprises decoder gates A9A, A9B, A9D and an electronic attenuator circuit. The attenuator circuit is shown in FIG. 9 and will be described hereinafter. The output signals from decoder gates A9A and A9B are transmitted by power control terminal 34 and power control terminal 35, respectively, to the attenuator circuit. By varying the signals on terminals 35 and 34 in accordance with the truth table in FIG. 8, the portable transceiver transmits coded directional and distress signals at incrementally increasing power levels. For example, during the first transmission from the portable handset the 10% (50mw) power control terminal 34 is selected via decoder gate A9A since terminals 32 and 33 of binary counter 115 is logical 0. Similarly, when terminal 32 is logical 0 and terminal 33 is logical 1 the 25% (250mw) power control terminal 35 is selected via decoder gate A9B. It should be noted that decoder gate A9D which controls the transmission cycle latch 48 does not reset the transmission cycle latch until the portable handset cycles through an incrementally increasing range of power transmission. Although FIG. 8 depicts a system which transmits signals incrementally at one of three power levels, this should not be construed as a limitation on the scope of the invention. It would be obvious in light of the teachings herein to devise a system having the capability to transmit signals incrementally at N power levels where N is greater than or less than three.

Referring now to FIG. 9, a RF three-level electronic attenuator circuit which is logic level compatible is disclosed. This attenuator circuit comprises a voltage supply with a positive and negative terminal. The positive terminal of the voltage supply is connected through coil 60 to terminal 70 of the electronic attenuator circuit and the negative terminal of the voltage supply is grounded. One terminal of capacitor 61 is interconnected to terminal 70 and the other terminal of capacitor 61 is interconnected to an output resistor 62 while the other terminal of output resistor 62 is grounded. One terminal of another resistor 67 is connected to terminal 70 of the attenuator circuit and the other terminal of resistor 67 is interconnected to capacitor 68.

Switching means 66 has three terminals. The first terminal of switching means 66 is interconnected through a coil 69 to terminal 34, the second terminal of switching means 66 is interconnected through a resistor 65 to terminal 70 and the third terminal of the switching means 66 is grounded. Similarly, switching means 64 also has three terminals, one terminal being interconnected through coil 71 to terminal 35, the second terminal being interconnected through resistor 63 to terminal being 70, and the third terminal grounded.

For illustration purposes, switching means 66 and 64 are depicted in FIG. 9 as NPN transistors having control terminals 34 and 35 interconnected through coils 69 and 71 to their bases. If it is desired to use PNP transistors for switching means 66 and 64, this could be accomplished by reversing the polarity of the voltage supply. Of course, it is recognized that switching means other than transistors could successfully be utilized for switching means 66 and 64. For example, vacuum tubes, SCR's and the many other substantially high speed switching means may be used. Following is a list of approximate values of resistors and capacitors which are used in the circuit of FIG. 9.

| | |
|---|---|
| 62 | 500 ohms |
| 63 | 120 ohms |
| 65 | 620 ohms |
| 67 | 510 ohms |
| 61 | 100 pf |
| 68 | 100 pf |

As previously stated, terminals 35 and 34 are the control terminals for the electronic attenuator circuit. By varying the signals on terminals 35 and 34, at predetermined intervals, the output impedance due to the switching action of switching means 66 and 64, varies across output resistor 62. Since the impedance total including output resistor 62, is the input impedance to the power amplifier of transmitter 21 (FIG. 2), the output power of the portable handset will change depending on the input impedance to the power amplifier.

Still referring to FIG. 9, a logical 1 at, for example, terminal 35 and a logical 0 at terminal 34 causes switching means 64 to saturate, shunting resistor 63 to ground. This forms a voltage divider action between series resistor 67 and the parallel resistance of resistors 63 and 62. The effect is to reduce by a fixed amount the power delivered to the power amplifier. A similar action takes place when the signal on terminals 35 and 34 are reversed. Switching means 66 will now be saturated shunting resistor 65 to ground. A voltage divider action is then formed between resistor 67 and the parallel resistance of resistors 65 and 62. Since the equivalent resistance in the circuit is less than the previous amount, the power delivered to the power amplifier will be higher. Maximum power is realized when both switching means 64 and 66 are saturated thereby shunting resistor 63 and resistor 65, respectively, to ground.

Now referring again to FIGS. 3 and 3*a*, acknowledge decoder 29 receives the first and second acknowledge signals from the roadside relay station and uses these signals to either stop the power sequencing or turn off the handset. As previously mentioned, the portable handset transmits coded signals at incrementally increasing power levels and cycles until reception of an answer back signal at one of the power levels. On receipt of the first acknowledge signal, acknowledge decoder 29 inhibits the power sequencing circuitry of the portable handset from stepping into a higher power level. Likewise, the second acknowledge signal turns off the portable handset. The acknowledge decoder 29 comprises a storage device A8A, a first shift register 36 and a second shift register 37. The storage device and the shift registers of the acknowledge decoder are connected in tandem with the storage device first in line receiving the acknowledge signals from the remote stations. It should be noted that the storage device may be a latch or any other form of storage means. The first acknowledge signal is generated at the roadside relay station while the second acknowledge signal is generated at the terminal station.

Referring still to FIGS. 3 and 3*a*, control logic 23 comprises a plurality of logic circuits which function in combination to control the transmission of coded signals at programmed intervals, i.e., predetermined intervals. Each of the logic circuits within the combination will now be described. When DC power is turned on via the power on switch 15, as explained previously, the power on reset generator 38 generates a momentary system reset pulse. This reset pulse resets all counters and storage devices to their initial states. System reset latch 39 maintains a reset on the binary counter 115 through control gate 40 until depression of the push-to-send switch 22. When the push-to-send switch 22 is depressed, a logical 1 is created at the input of gate 41, while the output of gate 41 goes to logical 0. This logical 0 is inserted into inverter 42 and sets storage device 43 causing $\overline{Q}$ of storage device 43 to go to logical 0. This logical 0 then disables gate 41, thus inhibiting the push-to-send switch function and causing gate 41 to return to its normal logical 1 state. With this scheme, once the push-to-send switch is depressed, the system becomes automatic and the push-to-send switch has no further effect on the system until the portable handset is turned off automatically by the second acknowledge signal.

When gate 41 goes to logical 0, at the depression of the push-to-send switch, gate A5A, which is interconnected to gate 41, goes to logical 1 generating, thereby, a negative pulse at the output of gate 44. Since gate 44 is interconnected to the transmission duration latch 45, the negative pulse sets the transmission duration latch. The transmission duration latch is set at the beginning of each transmission cycle and controls the frequency of transmission from the character storage 19. The transmission duration latch 45 is interconnected to a storage element 46 and provides a clocked transmit enabling pulse at the output of the storage element 46. The clocked transmit enabling pulse resets counter 100. As discussed above, when the last character of the system entry ID code (7th character) is transmitted, output 5 of counter 100 goes to logical 1 which resets the transmission duration latch 45 through AND/OR select gate 47. This terminates the first transmission.

Still referring to FIGS. 3 and 3*a* and concurrently to FIG. 8, during the first transmission, the 10% power control is selected (i.e., the output power of the portable handset is 10% of rated power) via decode A9A since terminal 32 and terminal 33 of the binary counter 115 are at logical 0's. Similarly, the 25% power control is selected by decode A9B since terminal 32 is at logical 0 and terminal 33 is at logical 1. During each transmission cycle, the transmission cycle latch 48 remain set until terminal 32 and terminal 33 are at logical 1's and then decode A9D resets the transmission cycle latch 48 and a new transmission cycle is initiated.

Intermittent transmissions of a coded message at incrementally increasing power levels during a given transmission cycle are initiated when terminal 30 (delay A) of the binary counter 115 goes from a logical 1 to a logical 0. This generates a positive going pulse at the output of transmit initiate gate 49 causing $\overline{Q}$ of shift register 50 to go to a logical 0. Shift register 50 is interconnected to gate 44 and a logical 0 on $\overline{Q}$ of shift register 50 creates a logical 1 at the output of gate 44, and as explained above, a new transmission is initiated. Shift register 50 is immediately reset ($\overline{Q}$ to logical 1) when gate 41 goes to logical 1. As explained above, intermittent transmission occurs until terminal 32 and terminal 33 of counter 115 both go to logical 1's which reset the transmission cycle latch 48 via decode A9D. With the transmission latch 48 reset, the transmit initiate gate 49 is inhibited. Further transmissions are, therefore, disabled until terminal 31 of the counter 115 (delay B) goes to logical 1 setting the transmission cycle latch 48, thus, starting a new transmission cycle.

Referring now to FIG. 7, each transmission cycle (XMIT cycle) comprises a plurality of intermittent transmissions, (transmit 1, transmit 2, transmit 3). Each of these transmissions are at an incrementally higher power level than the proceeding transmission. For example, transmit 2 is at a higher power level than transmit 1. Also, delay A is interposed between intermittent transmissions and delay B is interposed between consecutive transmission cycles.

Referring again to FIGS. 3 and 3*a*, and as described above, acknowledge decoder 29 comprising a storage device A8A, a first shift register 36 and a second shift register 37 receives two acknowledge signals from the roadside relay stations. On receipt of the first acknowledge signal, the storage device A8A is set and clocks a logical 1 into shift registers 36 and 37. When $\overline{Q}$ of shift register 36 goes to logical 0, an immediate retransmission is initiated via gate A5A. The logical 0 from shift register 36 also prevents further automatic retransmissions until shift register 36 is reset. The transmitted message initiated by receipt of the first acknowledge is terminated when terminal 6 of the counter 100 goes to a logical 1 resetting the transmission duration latch 45 via AND/OR select gate 47. The portable handset, which is a transceiver as described, now cycles until a second acknowledge signal is received causing terminal $\overline{Q}$ of shift register 37 to go to a logical 1. Terminal $\overline{Q}$ of shift register 37 is interconnected to one input of control gate 116. The other input of control gate 116 is the output of a free running oscillator 53, and the output of control gate 116 is the clock to counter 115. When terminal $\overline{Q}$ of shift register 37 goes to a logical 1, the clock to counter 115 is disabled and the acknowledge indicator 52 is activated, thus, advising the motorist that his message has been received.

DESCRIPTION OF THE ROADSIDE RELAY STATION

Having described the portable handset, the roadside relay station will now be described. As explained above, the roadside relay stations route messages or coded signals originating from the portable handset to the terminal station and vice versa.

Figure 4:
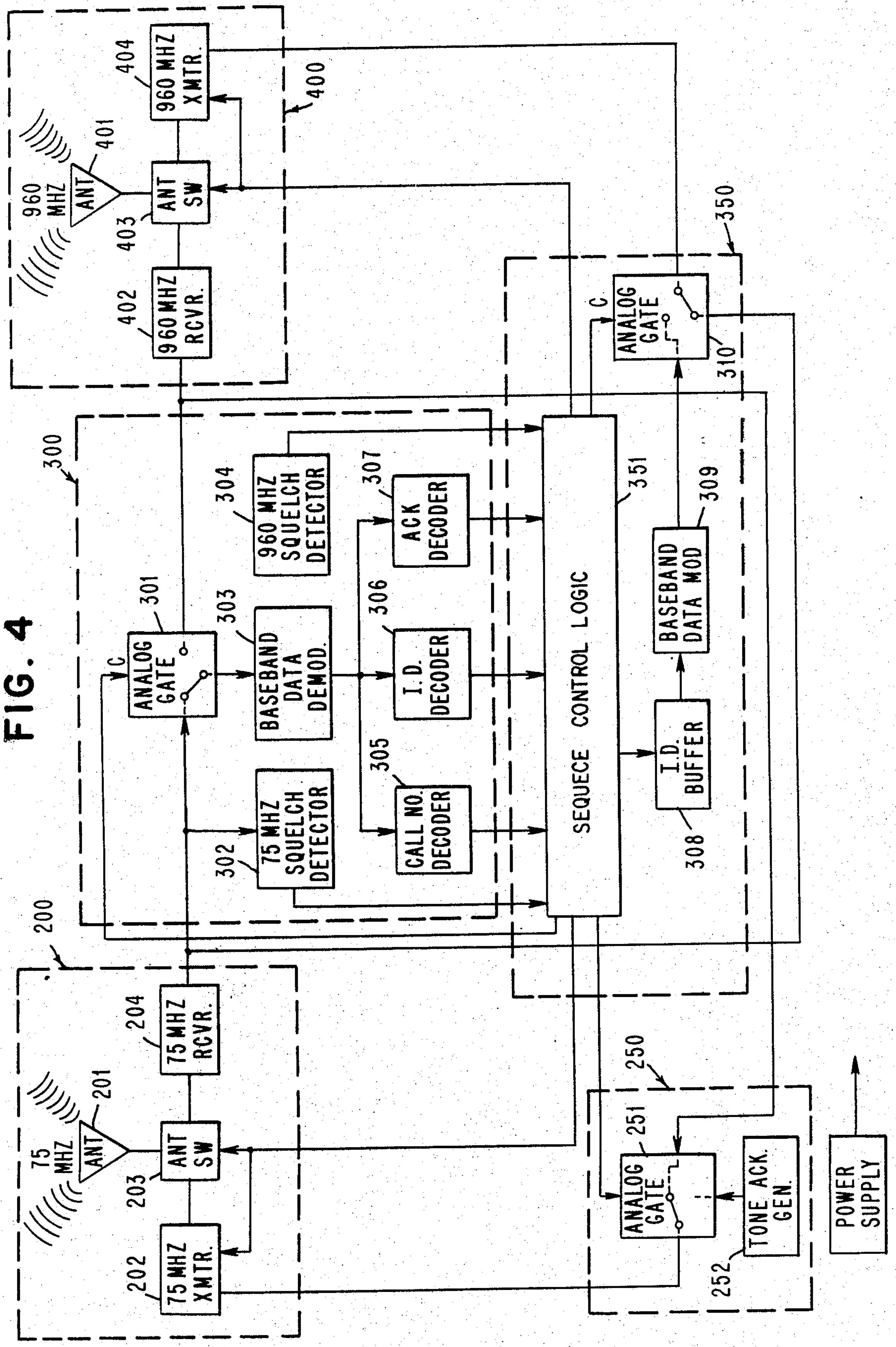
FIG. 4 shows the roadside relay station of the present invention in block diagram form.

Shown in FIG. 4 is a block diagram of the roadside relay station comprising two co-channel transceivers 200 and 400 with associated baseband circuitry 250 and 300, and control logic 350 for routing coded messages or signals originating at the portable handset to the base station and vice versa. The co-channel transceiver 200 comprises a 75 MHz antenna 201 interconnected through an antenna switch 203 to a 75 MHz transmitter 202 and a receiver 204. The antenna 201 receives coded messages or signals from the portable handset via the A link as explained previously. Likewise, the antenna 201 transmits coded messages or signals to the portable handset via the A link as explained previously. The antenna switch 203 which is under the control of sequence control logic 351 controls the antenna, i.e., connects the antenna to either the transmitter 202 or the receiver 204, depending on whether the roadside relay station is receiving signals from the portable handset, or transmitting signals to the portable handset. Similarly, co-channel transceiver 400 comprises a 960 MHz antenna 401 interconnected through an antenna switch 403 to a 960 MHz transmitter 404 and a 960 MHZ receiver 402. The antenna 401 receives and transmits coded signals or messages from/to the base station via the B link as also explained previously. The antenna switch 403 connects the antenna to either transmitter 404 or receiver 402 depending on whether the roadside relay station is receiving signals from the base station or transmitting signals to the base station. Antenna switch 403 is also controlled by the sequence control logic 351. It should be noted that the 75 and 960 MHz frequencies are only used for illustration purposes and that other suitable frequencies, within the emergency band, may be used.

Under normal conditions, the roadside relay station is in a full standby mode, i.e., receiver 204 and receiver 402 are active. When a portable handset transmits a message, the squelch code preamble in the message is detected by the 75 MHz squelch detector 302 prior to base band data demodulation. The input of squelch detector 302 is interconnected to receiver 204 and the output thereof is interconnected to Timer A located within the sequence control logic 351. The sequence control logic 351 comprises a plurality of logic gates and timing circuit means to enable the proper sequencing of coded messages or signals to the base station via the B link, or to the portable handset via the A link. FIG. 10 discloses a detailed timing diagram of the timing circuit means located within the sequence control logic 351 and will be described hereinafter. The timing circuit means (not shown) are similar to timing circuits used in modern digital computers, e.g., delay lines or counters. The implementation of these timing circuit means are well known in the art and will not be discussed any further.

Referring still to FIG. 4, the receiver 204 is interconnected to gating means 301 and gating means 310. The gating means 301 and 310 are controlled by sequence control logic 351. Gating means 301 connects either the receiver 204 or receiver 402 to the base band data demodulator 303. The output of the base band data demodulator 303 is interconnected to a plurality of decoders namely: call number decoder 305 which decodes the system call number, identification decoder 306, which decodes the relay station identification number and acknowledge decoder 307 which decodes the acknowledge signal transmitted from the base station. The output of decoders 305, 306 and 307 are interconnected to sequence control logic 351. Likewise, gating means 310 connects receiver 204 to transmitter 404 when the roadside relay station is in the transparent mode, and it also connects base band data demodulator 309 to transmitter 404. Identification buffer 308, which is interconnected to base band data modulator 309 and sequence control logic 351, contains the permanent identification number of a particular roadside relay station. During the first transmission from the roadside relay station to the base station, gating means 310 connects the data modulator 309 and the identification buffer 308 to transmitter 404 so that the roadside relay station can transmit its identification number to the base station.

When the roadside relay station is communicating with the base station, the B link is in use. Receiver 402 receives coded messages from the base station if the roadside relay station is in the transparent mode, i.e., coded signals from the handset pass through the roadside relay station without being checked. Gating means 251 connects receiver 402 to transmitter 202. Gating means 251, which is interconnected to sequence control logic 351, also connects tone acknowledge generator 252 to transmitter 202. Tone acknowledge generator 252 generates the first acknowledge signal which is transmitted to the portable handset via the A link. The 960 MHz squelch detector 304 is interconnected to receiver 402. Unless the detector 304 detects the proper squelch code, the roadside relay station will not receive messages from the base station over the B link. The output of detector 304 is interconnected to Timer B which is located within the sequence control logic 351.

Referring now to FIG. 10, a detailed timing diagram of the sequence control logic 351, of FIG. 4, is shown. Normally, the roadside relay station is in the full standby mode, i.e., the 75 MHz receiver 204 and the 960 MHz receiver 402 are active. When a subscriber set transmits its message, the squelch code preamble is detected prior to demodulation by the base band data demodulator 303. This sets Timer A, selects the 75 MHz RF output to the base band data demodulator 303 and enables the call number decoder 305. Timer A is adjusted to allow sufficient time for receipt of the system call number from the portable handset via the A link. If there is an output from call number decoder 305 when Timer A times-out the delay is initiated and full standby mode is disabled. If no call number decode exists at th end of Timer A (caused by a false alarm or a detection error) the relay remains in full standby mode. The delay T is unique to each of a group of consecutive roadside relay stations and is employed to eliminate the possibility of simultaneous transmissions therefrom. This delay will be in the order of 0.5 to 4 seconds. When the delay T expires, the 960 MHz transmitter 404 is powered-up in preparation for transmission of the relay ID to the base station. After a $\Delta t$ delay (approximately 50 to 100 ms) to permit the 960 MHz transmitter 404 to stabilize, the relay ID is transmitted to the base station via the B link. Immediately following the transmission of the relay ID, the roadside relay station selects the 960 MHz receiver RF output to base band data demodulator 303, sets Timer B, and returns to 960 MHz standby in preparation for the return message from the base station in response to the relay ID. If Timer D expires prior to receipt of a 960 MHz squelch code by squelch code detector 304, the roadside relay station reverts to full standby. If, on the other hand, the squelch code is detected prior to time-out of Timer D, Timer B is set and the call number and ID decoders are enabled. Timer B allows sufficient time for receipt of the system call number and the relay ID from the base station. If a call number and ID code have occurred prior to time-out of Timer B, the first acknowledge signal is transmitted to the portable handset, the roadside relay station is then set in the transparent mode and Timer C is set. The first acknowledge signal is generated by tone acknowledge generator 252. Timer C allows sufficient time for transmission of the coded message or signal from the portable handset through the transparent roadside relay station to the base station and receipt of the second acknowledge signal at the portable handset. The second acknowledge signal is generated at the base station. When either Timer C expires or receipt of the second acknowledge signal (from the base station) occurs at the roadside relay station, it returns to full standby mode. The approximate values of the nominal delays represented in FIG. 10 are:

| | |
|---|---|
| Subscriber Message | 2 sec. max |
| Timer A | 1 sec. |
| Timer B | 1 sec. |
| Timer C | 3 sec. |
| Timer D | 5 sec. |
| delay T | 0.5 to 4.0 sec (variable) |
| Δt Delay | 100 ms |

This ends the description of the roadside relay station.

TERMINAL STATION

As noted above, the roadside relay station transmits coded signals via the B link to the terminal station. At the terminal station, the coded signal is decoded and a second acknowledge signal is generated. The second acknowledge signal is transmitted via the B link to the roadside relay station. The roadside relay station then transmits the second acknowledge signal via the A link to the portable handset. This second acknowledge signal turns off the portable handset.

Figure 5:
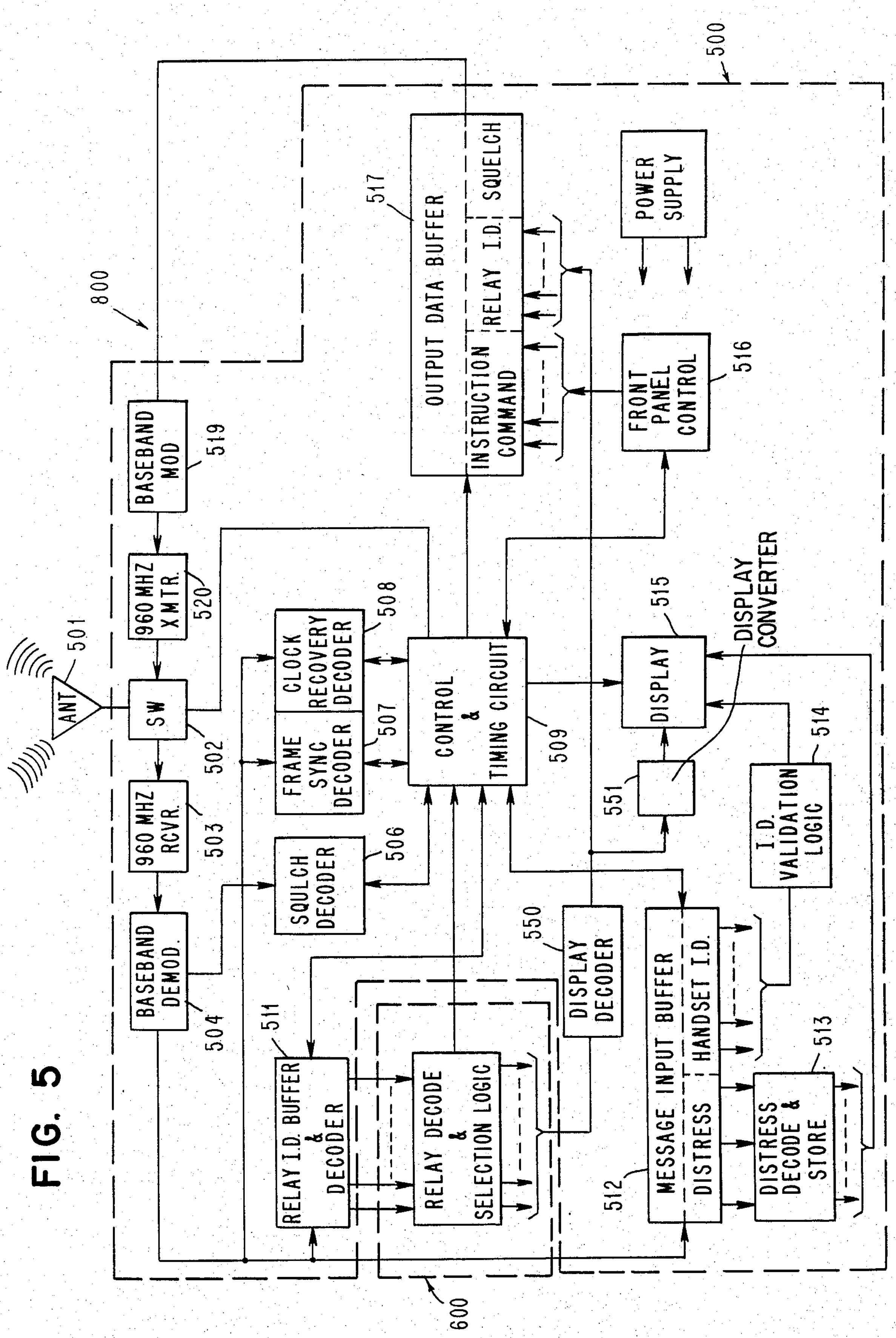
FIG. 5 shows the terminal station of the present invention in block diagram form.

Referring now to FIG. 5, a block diagram of the terminal station 800 which includes the roadside relay selection circuit means 600 and related circuitry 500 is shown. The roadside relay selection circuit means 600 determines the location of the roadside relay station which is closest to the portable handset.

Related circuitry 500 comprises an antenna 501 for receiving and transmitting coded signals. Antenna 501 is interconnected to switch means 502 which switches the antenna to receiver 503, if the terminal station is receiving coded signals, or switches antenna 501 to transmitter 520, if the terminal station is transmitting coded signals. Switching means 502 is controlled by the control and timing circuit means 509. The control and timing circuit means 509 comprises a plurality of logic gates and timing circuits (not shown) which control the proper flow of data within the terminal station (also referred to as base station). The timing circuits and logic gates are analogous to the timing circuits and logic gates used in digital computers and will not be discussed any further. When the roadside relay station transmits a coded signal, antenna 501 picks up the coded signal and transfers the coded signal to receiver 503. The signal is then demodulated by base band demodulator 504. Squelch decoder 506 decodes the squelch code and the output of decoder 506 sets Timer D which is located within the control and timing circuit 509. Having set Timer D, frame synchronize decoder 507 decodes the frame synchronize bit from the transmitted signal. The frame synchronize bit identifies the beginning of the message. Likewise, the clock recovery decoder 508 decodes and recovers the clock bit from the transmitted signal. The identification number of the roadside relay station from which the message was transmitted is then the identification by the relay identification decoder 511. The output of theidentification decoder 511 is interconnected to the relay selection logic circuit 600 while the input to the relay identification decoder 511 is controlled by control and timing circuit 509.

Figure 6:
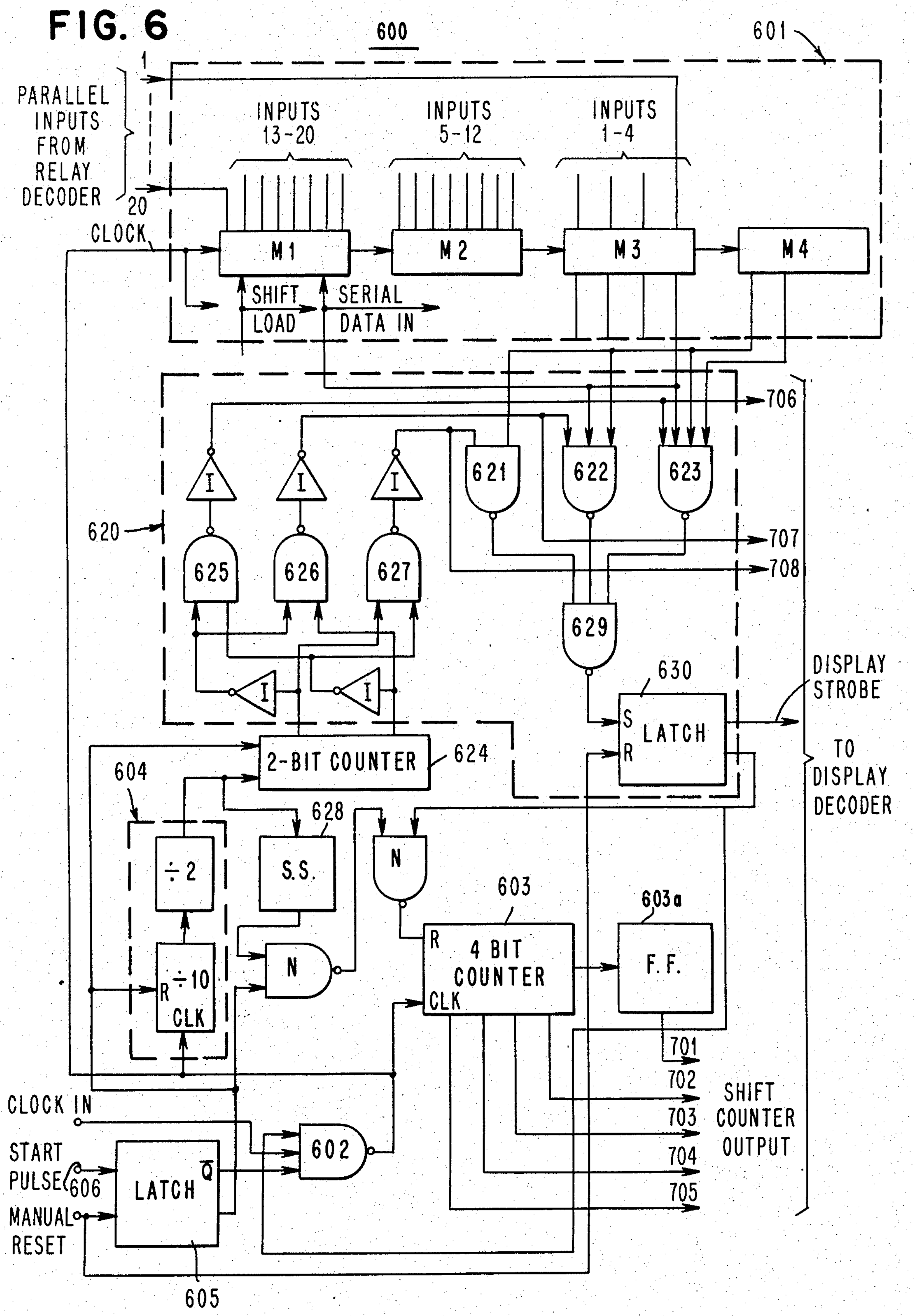
FIG. 6 shows in detail the location logic in the terminal station for locating the roadside relay station closest to the transmitting portable handset.

Referring now to FIG. 6 and FIG. 5 concurrently, a more detailed schematic of the relay selection logic circuit 600 is shown. As noted above, the relay selection logic circuit 600 determines the location of the transmitting handset based upon the decoded relay identification signals transmitted from a roadside relay station. For illustration purposes, the determined location references the closest relay station to the vehicle. This information is outputted to the display decoder logic 550 in the form of a f-bit binary character plus three control bits. The output of the display decoder 550 is then fed into a display converter 551 and finally displayed on the display means 515.

As noted above the relay identification decoder 511 provides 20 input signals to the storage means 601 (hereinafter called event buffer 601). Each input signal represents a responding relay station. It should be noted that the 20 inputs are not activated simultaneously since the portable handset cannot illuminate all 20 roadside relay stations during any one transmission. In fact, it is highly improbable that more than three roadside relay stations will be illuminated in response to the coded signal transmitted from a portable handset. This is due to a combination of reasons, namely: the spacing between the roadside relay station and the low power level at which the handset transmits coded signals. Event buffer 601 comprises a plurality of shift registers namely: M1, M2, M3, and M4. The shift registers are connected in tandem, with each shift register receiving a predetermined number of roadside relay station identification numbers from the relay decoder 511. The roadside relay identification numbers are stored in their corresponding shift register stages. Shift register M1 is interconnected to the output of clocking gate 602. The output of clocking gate 602 is also interconnected to a four bit counter 603 and a divide circuit 604. Clocking gate 602 is controlled by memory means 605. When a start pulse is applied to memory means 605, over terminal 606, the $\bar{Q}$ output of memory means 605 enables the clock in pulse, via clocking gate 602 to trigger the counting means 603, the divide circuit 604 and event buffer 601. Additionally, the $\bar{Q}$ output of memory means 605 switches the event buffer 601 from parallel load mode to serial shift mode via clocking gate 602.

The relay selection logic circuit 600 is now conditioned to sweep the data content of shift registers M1, M2, M3 and M4 through the detection logic 620 to determine whether 1, 2 or 3 consecutive roadside relay stations responded to the signal transmitted by the portable handset. The detection logic circuit 620 comprises a plurality of compare gates 621, 622 and 623. The data representing the roadside relay stations, which are stored in shift register M1, M2, M3 and M4, are shifted or swept in a left-to-right fashion passed the detection line feeding into compare gates 621, 622 and 623. In order to prevent data loss, the output of shift register M3 feeds back into shift register M1. Three sweeps are made. On the first sweep the data in event buffer 601 is tested by compare gate 623 to determine if three consecutive logical 1's are contained within event buffer 601. It should be remembered that each stage or each logical 1 in the event buffer 601 represents a roadside relay station. Therefore, three consecutive logical 1's indicate that three roadside relay stations were activated by the transmission from the portable handset. On the second sweep, compare gate 622 tests to determine if two consecutive logical 1's contained within event buffer 601. On the third sweep, compare gate 621 tests to determine if one logical 1 is contained within event buffer 601. During each of the three sweeps, one of the three compare gates 621, 622, 623 is enabled sequentially by the sweep counter 624 via gates 625, 626 and 627. For example, during the first sweep, compare gate 623 is enabled by gate 625 while compare gates 621 and 622 are disabled. Similarly, on the second sweep, compare gate 622 is enabled while compare gates 621 and 623 are disabled, and on the third sweep, compare gate 621 is enabled while compare gates 623 and 622 are disabled. The sweep counter 624 is incremented at the end of each sweep via the output of the divide circuit 604. Whenever a compare occurs, memory means 630 is set via gate 629 and the sweep is halted. The output from memory means 630 is used to strobe the display decoder 550. Simultaneously, with the comparing progress, counting means 603 and flip flop 603*a* count the number of shifts which occur during each sweep until a compare is detected. The counting means 603 is reset to zero at the beginning of each shift by the output from the divide circuit 604 via the one-shot circuit means 628. When a compare occurs, the state of the counting means 603 and flip flop 603*a* as indicated on terminals 701, 702, 703, 704 and 705 along with the sweep number indicated on terminals 706, 707 and 708 are decoded by display decoder 550 identifying the location of the closest roadside relay station to the transmitting portable handset. The binary representations of terminal 701, 702, 703, 704 and 705 are as follows:

| Terminal | Binary Representation |
|---|---|
| 701 | 16 ($2^4$) |
| 702 | 8 ($2^3$) |
| 703 | 4 ($2^2$) |
| 704 | 2 ($2^1$) |
| 705 | 1 ($2^0$) |

The display decoder 550 decodes the output of counting means 603 and flip flop 603*a* on terminals 701, 702, 703, 704 and 705 and the sweep number indicated on terminals 706, 707 and 708 in the following manner: For illustration purposes, it is assumed that counting means 603 and flip flop 603*a* comprise a 5-bit shift counter. It is also assumed that N denotes the binary representation of the 5-bit shift counter output. As previously mentioned, counting means 603 and flip flop 603*a* keep track of the number of shifts which occur during each sweep until a compare is detected and each shift is equivalent to the ID number of a roadside relay station. Therefore if on sweep number 1, a compare is detected, (i.e., three consecutive 1's in event buffer 601) then N is the first ID number of the three roadside relay stations closest to the portable handset. Similarly if a compare is detected on sweep number 2, or sweep number 1, N is displayed as the ID number of the roadside relay station closest to the portable handset. The output of the display decoder 550 feeds into the display converter 551 and is displayed on display means 515 (see FIG. 5). The output of the display decoder 550 is interconnected to output data buffer 517. Output data buffer 517 contains a message which has to be transferred in the form of coded signals via the roadside relay station to the portable handset.

After relay selection logic 600 determines the ID number of the roadside relay station closest to the portable handset, relay selection logic is initialized. The selected relay ID is displayed and the response message to the selected roadside relay station is formulated in the output data buffer 517. The 960 MHz transmitter 520 is then powered-up and the response message is transmitted to the selected roadside relay. Timer B is set which in turns sets the terminal station in the Message Return or Standby Mode. If Timer B expires, prior to receipt of the return message from the portable handset via the selected roadside relay, the base station automatically reverts to the standby mode. However, under normal circumstances, a return message would be received prior to Timer B time-out. In this case, the frame synch and bit clock is recovered and the received coded message or signal from the portable handset is stored in the input buffer 512. The distress signal and portable handset ID is then decoded, validated and displayed. Having displayed the distress signal and the ID number of the portable handset, a second output message is formulated and transmitted to the selected roadside relay station in order to acknowledge correct receipt of the coded message or signal. Immediately following this transmission, the terminal station reverts to the standby mode.

OPERATION

In normal operation (referring to FIGS. 2, 3 and 3*a*), an operator depresses power on switch 15 which sets system reset latch 39. The operator then keys into the portable handset distress and directional information via distress switch 18 and directional switch 17. The operator then depresses push-to-send switch 22 whereupon the handset becomes fully automatic (as previously described) and system reset latch 39 is released. On release of system reset latch 39, the 10% (50 mw) power output level is selected and the first transmission is made. The transmitted message is in the form of a coded signal containing the squelch code and the system call number. At the end of the first transmission, delay A is set and the portable handset cycles for the reception of an answer back signal (first acknowledge).

If no acknowledge signal is received prior to time-out of delay A, a successively higher output power is selected (25%, 250 mw) and the coded message is retransmitted. This procedure continues until the maximum power (50%) is transmitted. At this point, delay B is initialized. If we again assume that the first acknowledge signal was not received prior to time-out of delay B, the timing generator 24 is reset and the three intermittent transmissions are repeated at successively higher levels (10, 25, 50%). This entire cycle continues to repeat until the first acknowledge signal is received. Upon receipt of the first acknowledge signal, the portable handset halts the power sequencing scheme and automatically retransmits the entire message, including squelch, ID, distress and directional signals. Delay C is then initialized and the portable handset cycles for the reception of the second acknowledge signal. Assuming the second acknowledge signal is received prior to time-out of delay C, power is disabled to all circuitry and the acknowledge indicator is activated warning the operator that his message was received. If, however, no second acknowledge signal is received prior to delay C time-out, the portable handset reverts into the automatic transmission mode.

As described above, the squelch code, in the coded message transmitted by the portable handset, unlocks the roadside relay station. Timer A in the roadside relay station is set to allow sufficient time for receipt of the system call number. If there is an output from call number decoder 305 prior to time-out of Timer A, full standby mode is disabled and Timer A is initialized. If there is no output from call number decoder 305 at the end of Timer A (caused by false alarm or detection error) the relay station remains in full standby mode. Assuming that the call number decoder 305 decodes a valid call number, the relay station ID number which is stored in ID buffer 308 is then modulated on base band data modulator 309 and transmitted to the terminal station via the B link. Immediately following the transmission of the relay ID, the roadside relay station selects the 960 MHz receiver RF output to the base band data demodulator 303, sets Timer D and returns to the 960 MHz standby mode in preparation for the return message from the terminal station in response to the relay ID.

If Timer D expires prior to receipt of a 960 MHz squelch code, the roadside relay station reverts to full standby. On the other hand, if, the squelch code is not detected prior to time-out of Timer D, Timer B is set and the call number and ID decoders are enabled. Timer B allows sufficient time for receipt of the system call number and the relay ID from the base station. If a call number and ID decode have occurred prior to time-out of Timer B, the first acknowledge signal is generated by tone acknowledge generator 252 and is transmitted to the portable handset via the A link. The roadside relay station is then set in the transparent mode and Timer C is set. Timer C allows sufficient time for retransmission of the message from the handset through the transparent roadside relay station to the terminal station and receipt of the second acknowledge at the portable handset. When either Timer C expires or receipt of the second acknowledge occurs at the relay station, the relay station returns to full standby mode.

The roadside relay station transmits a combined coded message or signal to the terminal station via the B link. The combined message or signal includes the relay ID number which is used by the terminal station to determine the location of the roadside relay station closest to the portable handset. Referring to FIG. 5 and FIG. 6, relay decoder 511 decodes the ID number of the broadcasting relay station and loads the ID numbers into event buffer 601. Event buffer 601 functions as a data circulator whenever a train of clock pulses are applied via clocking gate 602. A data circulator is an electronic device in which the output feeds back into the input. By applying a train of clock pulses which shift the data left to right, the contents of the device are preserved. After loading event buffer 601, the inputs thereto are rendered inoperative. A predetermined number of clock pulses are applied to the data circulator so that the data is swept left to right passing compare gates 623, 622 and 621. Based on the configuration of the contents of the data circulator, the location of the closest roadside relay station to the transmitting portable handset is determined. Three sweeps are made. On the first sweep, compare gate 623 tests if three adjacent stages of the data circulator are at logical 1's. On the second sweep, compare gate 622 tests if two adjacent stages of the data circulator are at logical 1's. Finally, on the third sweep, compare gate 621 tests if one stage of the data circulator is a logical 1. For each sweep, counting means 603 and flip flop **603*a* count the number of clock pulses which are applied to the data circulator. Whenever any of the above three conditions are satisfied, the data circulator is disabled and the outputs of counting means 603 and flip flop 603*a*** and the sweep number identify the location of the closest roadside relay station to the transmitting handset.

The advantages of this system are several. By transmitting distress and directional signals to the terminal station at incrementally increasing power levels and cycling until reception of an acknowledge or answer back signal at one of the power levels, a minimum amount of power (low power) is utilized to establish contact with a terminal station. And as a result of the foregoing, electromagnetic interference is minimized. Additionally, by transmitting distress and directional signals at incrementally increasing power levels, only the roadside relay station which is within the immediate vicinity of the portable handset will be activated by the low power transmission, and as a result, the accuracy of locating the roadside relay station nearest the portable handset is enhanced.

Every portable handset has a unique identification number which is transmitted to the terminal station whenever a user activates the portable handset. The terminal station maintains a record of all the messages received and the ID number of the portable handset that transmits the message. This tends to discourage the use of the system by pranksters thereby minimizing false alarms.

While the invention has been particularly shown and described with reference to the preferred embodiment thereof, it will be understood by those skilled in the art that the foregoing and other changes in form and detail may be made therein without departing from the spirit and scope of the invention.

What is claimed is:

1. An improved emergency communication system for summoning help in case of an emergency comprising:

a portable transceiver having power level sequencing circuit means for transmitting a coded message on a first radio link at incrementally increasing power levels and for receiving a first acknowledge signal and a second acknowledge signal, said coded message comprising a squelch code, a transceiver identification code, a distress code and a directional code, said portable transceiver including acknowledge decoder means responsive to said first and said second acknowledge signals such that on receiving said first acknowledge signal, said power sequencing circuitry means is inhibited, thereby, stopping said portable transceiver from stepping into a higher power level, and such that on receiving said second acknowledge signal said portable transceiver is turned off;

a plurality of relay stations positioned along a highway for receiving said coded message on said first radio link and for generating and transmitting said first acknowledge signal on said first radio link, each of said plurality of relay stations including electronic enabling means responsive to said squelch code of said coded message such that a relay station nearest to said portable transceiver is enabled allowing said coded message to be received, and including relay receiving means responsive to said coded message and relay transmission means responsive thereto, thereby causing said portable transceiver to transmit at one of said incrementally increasing power levels, said enabled relay station relaying said distress code, said directional code and said portable transceiver identification code via a second radio link, and generating and transmitting a relay station identification code via said second radio link; and a terminal station for receiving said distress code, said directional code, said portable transceiver identification code and said relay identification code, said terminal station including display means for displaying said distress code, said directional code, said portable transceiver identification code and said relay identification code, locating means for determining the location of said relay station nearest to said portable transceiver by utilizing said relay identification code, and electronic circuit means for generating and transmitting said second acknowledge signal via said second radio link to said nearest relay station, said nearest relay station retransmitting said second acknowledge signal via said first radio link to said portable transceiver turning said portable transceiver off.

2. The emergency communication system as recited in claim 1 wherein said portable transceiver comprises:

input means for inputting distress and directional information;

storage means operably connected to said input means for receiving and assemblying information for transmission, said information for transmission being said coded message; and circuit means operably connected to said storage means for controlling automatic transmission of said coded message at predetermined intervals, and enabling said portable transceiver to operate at said incrementally increasing power levels until reception of said first acknowledge signal and for enabling said portable transceiver to operate at a fixed power level until reception of said second acknowledge signal turning said portable transceiver off.

3. The emergency communication system recited in claim 2 wherein said circuit means comprises:

gating means for controlling the transfer of signals generated by an oscillator, with one input of said gating means operably connected to the output of said oscillator and the other input operably connected to a first control signal means activated by said first acknowledge signal;

counting means having a plurality of outputs operably connected to the output of said gating means for generating a plurality of delay signals and for generating variable power sequence control signals; and system reset memory means operably connected through a second control signal means to said counting means until said system reset memory means is rendered inoperable by a push-to-send switch means.

4. The emergency communication system as recited in claim 2 wherein said circuit means includes a power sequence control circuit means comprising:

a voltage supply means having positive and negative terminals with a first terminal of a first coil connected to said positive terminal of said voltage supply means;

a first capacitor having a first terminal connected to a second terminal of said first coil and a second terminal connected to a first terminal of an output resistor, a second terminal of said output resistor being connected to said negative terminal of said voltage supply means;

a second capacitor having a first terminal connected to an RF driver means and a second terminal connected to a first terminal of a first resistor, a second terminal of said first resistor being connected to said first terminal of said first capacitor;

a pair of switching means, each of said switching means having at least three terminals, a first terminal of each switching means being operably connected through a second coil and a third coil respectfully to gating means for activating said switching means at predetermined intervals, a second terminal of each switching means being connected to said negative terminal of said voltage supply means and a third terminal of each switching means being connected through second and third resistors to said second terminal of said first coil and said first terminal of said first capacitor said pair of switching means controlling the attenuation of the output voltage of said power sequence control circuit across said output resistor by changing the impedance thereof.

5. An emergency communication system having a terminal station with a relay station identification decoder means for receiving and decoding a plurality of identification signals transmitted thereto by respective ones of a plurality of relay stations, said relay station identification signals each being transmitted together with a relayed coded message from a portable transceiver, said relay station identification decoder means providing a plurality of output signals each indicative of reception of a particular relay station identification signal, and said terminal station further including display means and relay selection logic circuit means for receiving said plurality of output signals to determine the location of said portable transceiver, said relay selection logic circuit means comprising:

event buffer means for storing and circulating said plurality of output signals;

a plurality of logic circuits connected to said event buffer means for determining the location of said relay station nearest to said portable transceiver;

control means operably connected to each of said logic circuits for sequentially enabling said logic circuits, one at a time, as said output signals in said event buffer means are circulated, and for generating timing control signals; and memory means operably connected to said logic circuits for storing location data obtained therefrom;

said display means being responsive to said timing control signals from said control means and said location data from said memory means, thereby, displaying the location of said relay station nearest to said portable transceiver.

* * * * *